March 23, 1943.  W. T. WHITE  2,314,748
CLOTHES DRYING APPARATUS
Filed April 1, 1939  4 Sheets-Sheet 1

William T. White INVENTOR.
BY
A. G. Burns ATTORNEY.

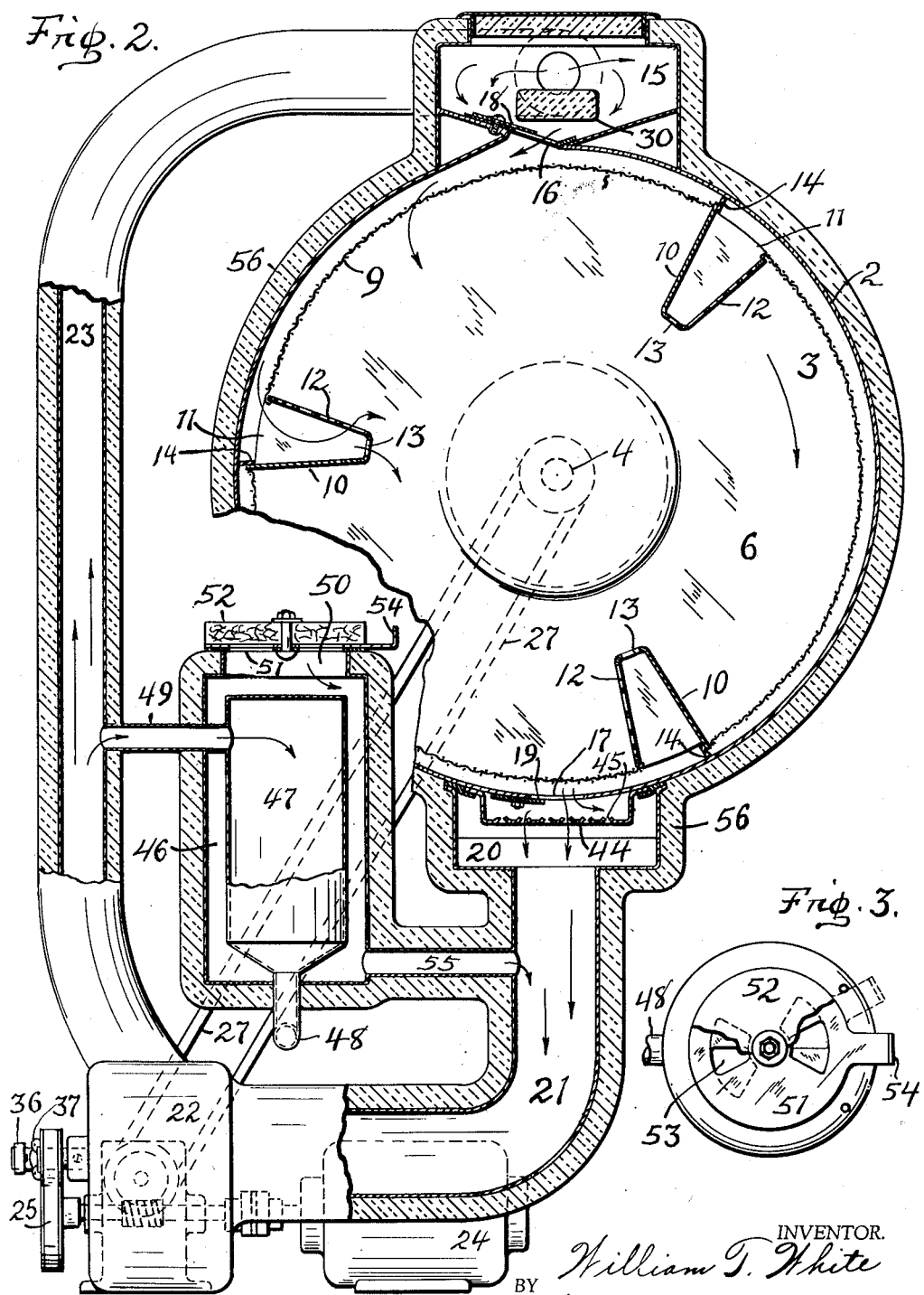

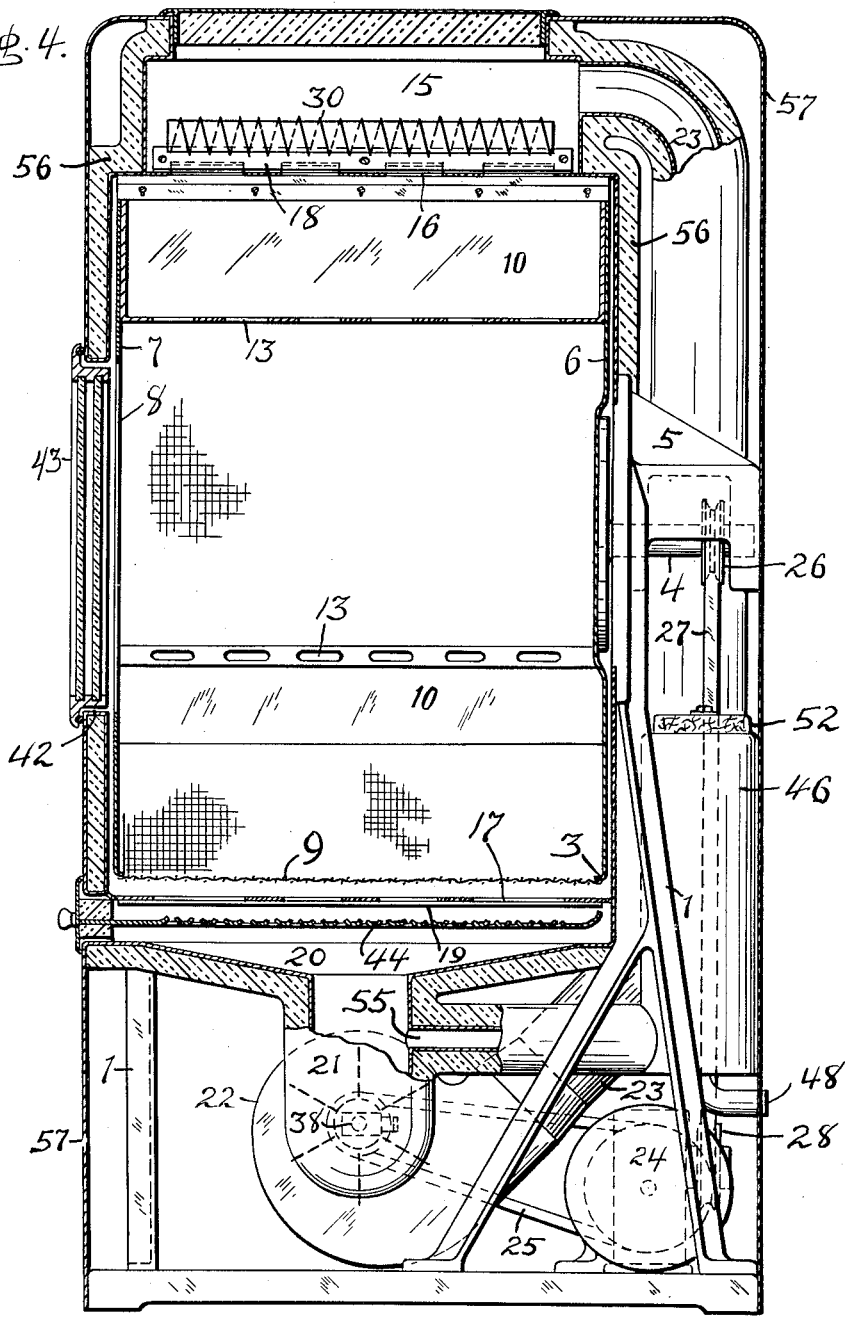

March 23, 1943. W. T. WHITE 2,314,748
CLOTHES DRYING APPARATUS
Filed April 1, 1939 4 Sheets-Sheet 4
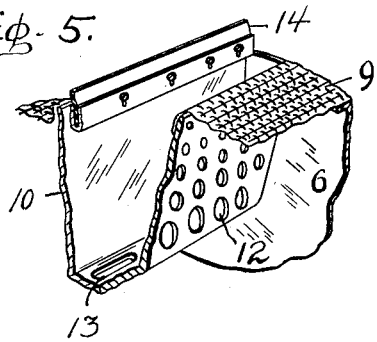
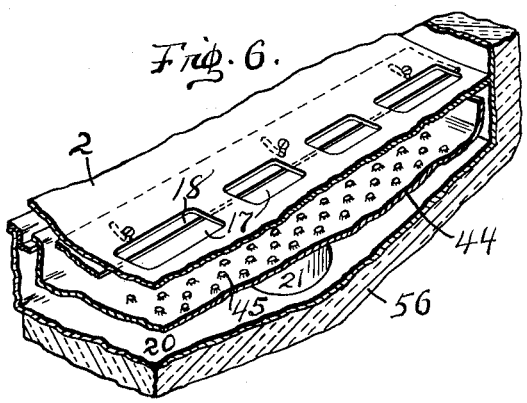
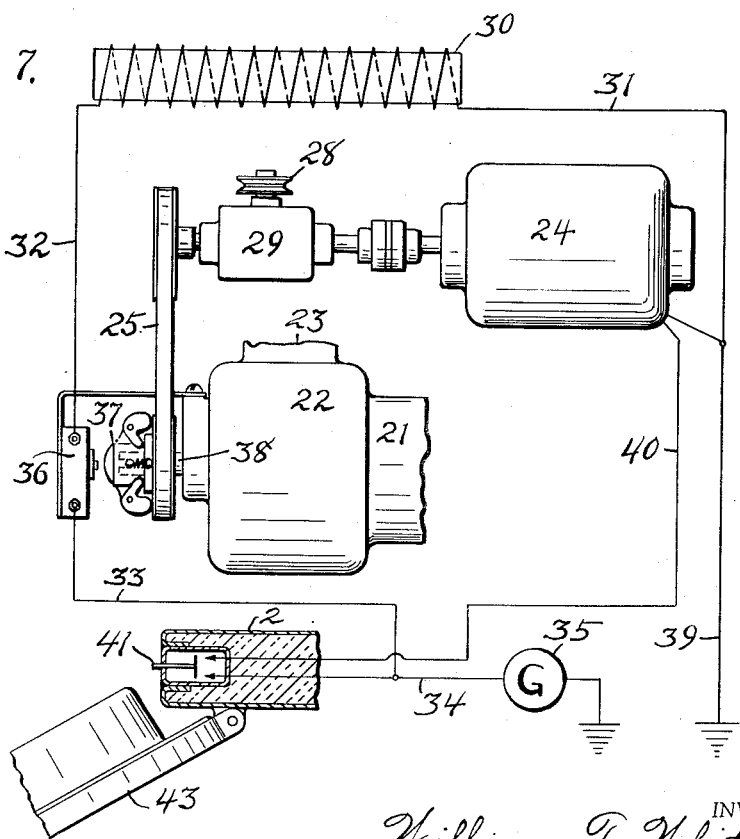
INVENTOR.
William T. White
BY
A. G. Burns ATTORNEY.

Patented Mar. 23, 1943

2,314,748

UNITED STATES PATENT OFFICE 2,314,748

CLOTHES DRYING APPARATUS

William T. White, Fort Wayne, Ind., assignor of one-third to William C. Rastetter, Jr., and one-third to Louis C. Rastetter, both of Fort Wayne, Ind.

Application April 1, 1939, Serial No. 265,581

5 Claims. (Cl. 34—86)

This invention relates to clothes drying apparatus, and an object thereof is to afford, in a clothes drying appliance having a revolving drum in which clothes to be dehydrated are moved about while subjected to a current of air that is circulated and recirculated therethrough, a provision for liberating a portion of the circulated air from the air stream in the circulatory course through the drum, and also a provision for admission of air to the circulating air stream whereby to replace the air previously liberated.

Another object of the invention is to provide, in an apparatus having a revolving drum for drying clothes and mechanism for circulating air through the drum, adjustable means for regulating the ingress and egress of the circulated air that passes through and about the drum, whereby is established circulation of the air uniformly during its passage from its entrance into the drum to exit thereof.

And a further object of the invention is to provide in a clothes drying apparatus having a revolving drum, means for circulating air therethrough, a heating unit in the path of the circulated air, a door through which access is had to the drum, and electrical means controlled by the door arranged in connection with the apparatus whereby to cause circulation of air through the drum and to energize said heating unit, so arranged that circulation of the air through the drum is dependent upon closing of the door and energizing of said heating unit is dependent upon circulation of the air through the drum being first established.

An illustrative embodiment of the invention is shown in the accompanying drawings, in which:

Fig. 2 is a similar view with parts broken away and in section;

Fig. 3 is a detail plan view of an air intake regulating appliance otherwise illustrated in Fig. 2;

Fig. 4 is a vertical section of the apparatus, the section being in a plane at right angles to that of Fig. 1;

Fig. 5 is a detail perspective view of one of the drag members and parts related thereto;

Fig. 6 is another detail perspective view of a part of the apparatus showing an adjustable damper for controlling the exit of air from the drum of the apparatus; and Fig. 7 is a diagram illustrative of the electrical controlling appliances that form part of the apparatus.

Figure 1:
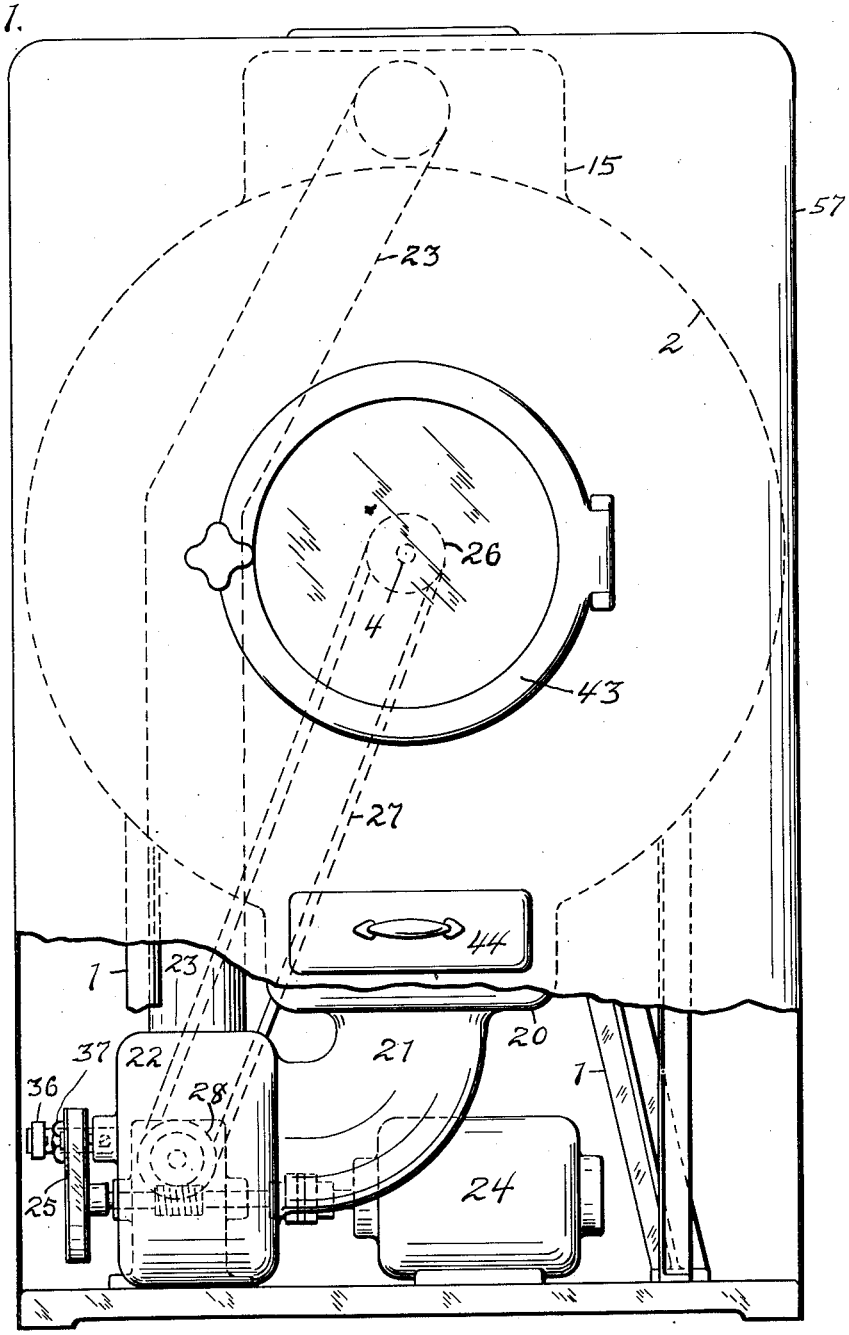
Fig. 1 is a front elevation of an apparatus in which the invention is embodied, a portion thereof being broken away.

The illustrative embodiment of the invention consists of a frame structure 1, provided for the support of the stationary parts of the apparatus, including a cylindrical shell 2 in which is rotatively mounted a drum 3 upon a shaft 4 that has bearing in a supporting bracket 5 secured on said frame structure 1.

The drum is closed at one end thereof by a head 6, and the opposite end thereof has a head 7 provided with an opening 8. The peripheral wall 9 of the drum is foraminous so as to permit ready passage of air and moisture therethrough, and is provided with interior drag members 10 that are V-shaped, the outer ends of which have openings 11 that extend through the wall 9 of the drum. Each drag member has made in one of its walls numerous apertures 12 that vary in diameter, those adjacent the wall of the drum being small comparatively as to those adjacent the inner ends of said members. Also, the inner ends of each drag member preferably has a series of openings 13 made in their inner ends for the passage of air therethrough.

Along one edge of each drag member adjacent its opening 11 is disposed an adjustable pliant flap 14 that closely approaches the inner face of the shell 2 whereby to deflect the air passing between the drum and the shell through the opening into the corresponding drag member.

The top of the shell has thereon an air inlet chamber 15 provided with openings affording passageways 16 for air to flow from said chamber into said shell, and also the bottom of said shell has openings affording passageways 17 for egress of air from said shell. There is provided an adjustable damper 18 that overlaps the inlet openings 16, whereby the amount of air passing through said openings into the shell is governed. Likewise, there is provided another damper 19 that underlies the outlet openings 17 in the bottom of said shell, whereby is governed the exit of air from said drum. Preferably, the openings 16 and 17 vary in size. For instance: The endmost openings are of greater dimensions than those located between said end openings, the purpose being to cause uniform distribution of the ingress and egress of air with respect to the shell and the drum. Thus is obviated tendency of the air stream to channel through a more or less direct course.

Provision is made for circulation and recirculation of air through the shell and drum and for concurrently rotating the drum, and also for heating the air during circulation thereof, whereby the clothes in the drum are kept loosely agitated and exposed to the air stream passing therethrough, thus to cause absorption of moisture from the clothes and entrainment thereof with the air stream.

The shell 2 has in connection with its bottom an outlet chamber 20 that receives the egress of air through the passageways 17 from the interior of the shell and the drum. Said outlet chamber has connection with a suction pipe 21 connected with the intake of a fan unit 22, and a pipe line 23 connects the discharge of the fan unit with the inlet chamber 15, so that upon operation of the fan unit, an air stream is established that circulates and recircuates continuously through the shell and the drum. The fan unit is preferably actuated by a motor 24 through the medium of a belt 25 as in the usual practice, and the drum shaft 4 has thereon a pulley 26 that is connected by a belt 27 with a pulley 28 that is driven by the motor 24 through the medium of a boxed gearing 29 of usual construction whereby the drum is rotated at the proper speed.

Within the inlet chamber is disposed a heating unit 30, preferably such as is ordinarily energized by electric current. The heating unit is connected in a circuit (Fig. 7) formed of conductors 31, 32, 33 and 34 with a source of energy such as a generator 35. Also, in said circuit is connected a controlling switch 36 that is so located as to be operated automatically by a centrifugal governor 37, preferably mounted on the fan-shaft 38 of the fan unit. Thus, closing of said circuit by the switch 36 is dependent upon operation of the fan unit whereby the heating unit becomes energized only during actitvity of the air stream circulating through the apparatus and absorption of the heat by the air that envelopes the heating unit as it passes through the inlet chamber. In this manner is obviated burning out of the heating unit.

The motor 24 preferably is energized by current from the generator 35 through conductors 39, 40 and 34, the motor circuit being controlled by a push switch 41. The front of the shell 2 has an opening 42 that is alined with the opening 8 in the front head 7 of the drum, and is provided with a hinged door 43 by which said opening is closed. Or, when opened, the door permits access to the drum.

The stem of the switch 41 is positioned so as to be actuated by the door when closed and thus the motor circuit is closed and the fan unit set in operation upon closing of the door, and is turned off automatically when the door is reopened. In this manner is assured operation of the fan unit only while the door is in closed position, and by the arrangement of the switch 36 and the governor 37 is assured the energizing of the heating unit only after operation of the fan unit has first been established. Also, is assured turning off of the current to the heating unit unit automatically when action of the fan unit is discontinued.

It is desirable to eliminate from the air stream loose particles, such as lint that becomes separated from the clothes as they are agitated in the drum. For this purpose there is provided a tray 44 removably positioned in the outlet chamber 20 that underlies the openings 17 in the bottom of the shell. Said tray has made in its bottom a multiplicity of perforations 45, the material of the tray immediately surrounding each of said perforations being extruded upwardly thus to cause arrest of or deterrence of the lint and prevent passage thereof through the perforations with the air that escapes through the outlet chamber.

A valuable feature of the invention is the expedient provided for elimination from the air stream, moisture that is absorbed from the damp clothes, and introduction of fresh and comparatively dry air into the air stream to replace the moisture-laden air that is liberated therefrom. Also, is provided another expedient for salvaging the heat of the liberated air by absorption thereof by the fresh dry air before it enters the air stream. These functions are accomplished by means of a heat exchanger constituted of a fresh air receiving chamber 46 in which is disposed an expansion drum 47 that is provided at its lower end with a discharge outlet pipe 48 which is exposed to the atmosphere. The upper end of said expansion drum has communication, through a connection 49 therefor provided, with the discharge pipe line 23 so that a portion of the air stream passing through the pipe line escapes therefrom into the expansion drum, and from thence through the discharge pipe 48 to the atmosphere.

The upper end of the receiving chamber 46 has an opening 50 covered by a damper 51 having on its top a filter pad 52 that covers the damper openings 53. The damper is provided with a handle 54 which, upon turning in one direction or the other, closes or opens the damper 53 more or less accordingly. The lower end of the receiving chamber has communication with the suction pipe 21 through a connection 55 so that as the air stream is drawn through the suction pipe into the fan unit more or less atmospheric air is drawn through the filter pad and receiving chamber into the air stream. As the fresh air envelopes the expansion drum 47 it absorbs more or less of the heat radiated from the expansion drum and thus enters the air stream in a heated condition and the temperature of the air stream therefore is not changed to a material extent because of entrance of the fresh air.

For the purpose of conserving the heat generated in the air stream by the heating unit, preferably, the shell, inlet and outlet chambers, suction pipe 21, pipe line 23, and the receiving chamber 46, and other parts through which the air stream passes are covered with insulating material 56, and the structure, including the apparatus generally, is covered by a conventional jacket 57 preferably constructed of sheet metal.

*Operation*

In use, the door is opened, and clothes that previously have been subjected to the ordinary washing and wringing processes, are placed in the drum through the door opening, after which the door is closed, whereupon the energizing circuit for the motor, through the medium of the switch 41, is automatically closed causing operation of the motor and consequent rotation of the drum and action of the fan unit. Upon turning of the fan shaft the switch 36 is automatically closed by the governor 37, thus closing the circuit whereby the heating unit 30 becomes energized. In this manner the clothes, agitated by the drag members, are tumbled about within the drum, and the heated air stream, impelled through the shell and the drum, mingles with the clothes while the clothes are suspended more or less loosely in the air stream, so that moisture from the clothes is absorbed by the air stream.

The air stream circulating and recirculating through the apparatus is heated during its passage through the receiving chamber and thereby is augmented dissipation of the moisture from the clothes. In passing through the shell and drum the air becomes more or less laden with moisture by absorption from the clothes and the moisture entrained thereby is subsequently eliminated from the air stream through operation of the heat exchanger as above described.

By adjustment of the dampers 18 and 19, the flow of air, through the passageways 16 and 17, is restricted to such extent as may be required to maintain within the drum, preferably, a light air pressure. In this manner the apparatus functions with maximum efficiency and minimum expenditure of energy.

Operation of the machine is continued until the contained clothes reach the desired state of dryness such as to be in suitable condition for the customary ironing operation that follows in ordinary laundry practice.

Variations of the particular construction of the appliances and the method above disclosed may readily be made by exercise of engineering skill without departure from the spirit or scope of the invention, and the following claims are intended to be inclusive of such variations.

What I claim is:

1. In a clothes drying apparatus, a rotating foraminous drum provided with drag members, a shell encompassing the drum provided with an inlet chamber at the top thereof and an outlet chamber at its bottom, a fan unit having suction and discharge pipes communicating respectively with said outlet and inlet chambers wherefore to establish an air stream through said drum and shell, a heating unit for the air stream, means for actuating said drum and fan unit having a motor, electrical circuits provided with a source of power whereby to energize said motor and heating unit, a door for the shell through which access is had to said drum, controlling means for automatically closing the circuit for the heating unit operated by the fan unit, and a second controlling means for automatically closing the circuit for the motor operated by said door whereby operation of said motor and heating unit is dependent upon the door being closed.

2. A clothes drying apparatus having a supported stationary shell provided with a door, a foraminous drum rotatable in said shell, a fan unit having a suction passage and a discharge passage that have communication respectively with said shell at opposite points whereby an air stream is established, when the door is closed, through the shell and drum upon operation of the fan unit for entrainment in said stream moisture absorbed from damp clothes contained in said drum, a heating unit for the air stream, actuating means for said drum and fan unit including a motor, electrical circuits provided with a source of power for energizing said motor and heating unit, controlling means for automatically closing the heating unit circuit operated by the fan unit when actuated, and a heat exchanger having closely adjacent outlet and inlet passages connected respectively with the discharge and suction passages of the fan unit, each of said outlet and inlet passages having constant communication therethrough with the atmosphere.

3. A clothes drying apparatus having a supported stationary shell provided with a door, a foraminous drum rotatable in said shell, a fan unit having a suction pipe and a discharge pipe that have communication respectively with said shell at opposite points whereby an air stream is established, when the door is closed, through the shell and drum upon operation of the fan unit for entrainment in said stream moisture absorbed from damp clothes contained in said drum, a heating unit for the air stream, means for actuating said drum and fan unit including a motor, electrical circuits provided with a source of power for energizing said motor and heating unit, controlling means for closing the circuit for the heating unit operated by the fan unit, and means permitting escape from said discharge pipe of a portion of the moist air stream and for admission of fresh dry air to a proportionate extent into said suction pipe thereby to eliminate accumulated moisture from said air stream.

4. In a clothes drying apparatus having a supported stationary shell provided with opposite inlet and outlet passageways, a rotatable foraminous drum disposed within said shell, said drum having a series of hollow drag members, each having an opening through the perimeter of said drum, one face of each member and the inner end thereof having a series of apertures, a pliant flap disposed along one wall of each drag member that closely approaches the inner face of said shell whereby to deflect the air passing between the drum and adjacent wall of said shell through the opening into the corresponding drag member, a fan unit having a suction pipe communicating with said outlet passageway, and also a discharge pipe line communicating with said shell and the drum through said inlet passageway, whereby is established through the drum and its drag members an air stream for entrainment of moisture absorbed from damp clothes contained in said drum, and means for activating said fan unit and drum.

5. In clothes drying apparatus having a stationary shell provided with opposite ingress and egress passageways, a rotating drum disposed within said shell including actuating means therefor, said drum having hollow drag members extending inwardly from its peripheral wall provided with openings through said wall, portions of each drag member having apertures therein, a pliant flap disposed in connection with the drum adjacent each of said openings that projects toward the inner wall of the shell, and means to create an air stream through said passageways, openings, apertures and the drum, thereby to absorb and entrain moisture from damp clothes contained in said drum.

WILLIAM T. WHITE.